United States Patent Office 3,332,919
Patented July 25, 1967

3,332,919
COPOLYMERS OF AROMATIC HETEROCYCLIC COMPOUNDS HAVING ETHYLENICALLY UNSATURATED SIDE CHAIN AND ALPHA MONO OLEFINS
Fritz E. Marktscheffel, Hamburg, Germany, and William C. Feist, Westfield, N.J., assignors to Esso Research and Engineering Company, a corporation of Delaware
No Drawing. Filed Dec. 12, 1963, Ser. No. 329,978
12 Claims. (Cl. 260—88.1)

The present invention relates to polymers of alpha olefins and heterocyclic nitrogen containing compounds having an ethylenically unsaturated side chain substituent and a process for their formation. More particularly, the present invention relates to the formation of copolymers of alpha olefins and alkenyl ring-substituteed heterocyclic compounds wherein nitrogen is the hetero atom and a process for their formation employing Ziegler type catalysts.

Polymerization of various types of olefinic monomers have, as is widely reported in the patent literature, been conveniently carried out employing Ziegler type catalyst systems which consist of the combination of a metal compound having reducing properties and a reducible heavy metal compound. While Ziegler type systems serve well in catalyzing certain types of polymerization reactions, their use in the past has been restricted since Ziegler type catalysts have not been successfully used in the polymerization of strongly polar monomers. Polar monomers, such as vinyl pyridine, will react with the catalyst system and in substance destroy its polymerization catalytic activity and thus prevent any polymerization.

It is therefore an object of this invention to provide new copolymers wherein at least one of the monomers is a polar monomer. It is a further object of this invention to provide a method for the polymerization of polar monomers employing Ziegler type catalysts. Other objects will become apparent in the following description and claims.

Now, in accordance with this invention, it has been found that polar monomers such as nitrogen containing cyclic compounds having ethylenic unsaturation in a hydrocarbon side chain substituent can be readily polymerized with $C_2$ to $C_6$ alpha olefins with Ziegler type catalysts by restraining the polar monomers characteristic to inhibit the catalyst components of the Ziegler system by complexing or by forming a salt of the polar monomer with a Lewis acid compound. It is especially surprising that relatively unreactive monoolefins such as propylene readily polymerize with the complexed polar monomer to form high molecular weight products.

The stability of the complexes formed between the polar monomer and the Lewis acid should be at least as high, preferably higher, than the stability of the complexes that may form between any of the components of the Ziegler catalyst system and the specific polar monomer used. Following the complexing of the polar monomer with the Lewis acid compound, the polymerization reaction with the polar monomer and an alpha olefin is carried out with Ziegler type catalyst at the temperatures, pressures, and catalyst concentrations normally employed with their use. The process of the present invention, therefore provides a method whereby polar monomers which normally deactivate the components of the Ziegler catalyst system can now be polymerized with a Ziegler catalyst.

The novel copolymers of the present invention can be prepared by contacting a $C_2$ to $C_6$ straight or branched chain alpha monoolefin or, more preferably, a $C_3$ to $C_6$ straight chain or branched chain alpha olefin with a $C_2$ to $C_8$ alpha alkenyl ring substituted heterocyclic compound wherein nitrogen is the hetero atom. Examples of useful alpha monoolefins are ethylene, proplene, 1-butene, 4-methyl-1-pentene, 1-pentene, and 1-hexene. Useful cyclic nitrogen compounds containing ethylenic unsaturation in a hydrocarbon side chain substituent include alkenyl substituted pyridines and quinolines, N—$C_1$ to $C_5$ alkyl-alkenyl substituted pyrroles, N—$C_1$ to $C_5$ alkyl-alkenyl substituted acridines, and N—$C_1$ to $C_5$ alkyl-alkenyl substituted carbazoles.

Representative, non-limiting examples of heterocyclic compounds that can be polymerized with alpha olefins include:

2-,3-, and 4-vinylpyridines,
3-(1-propenyl)pyridine,
3-ethyl-4-(1-butenyl)pyridine,
4-(1-octenyl)pyridine,
3-vinylquinoline,
6-vinylquinoline,
2-ethyl-7-(1-pentenyl)quinoline,
3-propyl-5-(1-heptenyl)quinoline,
N-ethyl-3-vinylpyrrole,
N-propyl-2-(1-butenyl)pyrrole,
N-butyl-4-(1-hexenyl)pyrrole,
N-methyl-2-vinylacridines,
N-propyl-7-(1-heptenyl)acridine,
N-butyl-1-(1-butenyl)acridine,
N-ethyl-5-(1-propenyl)acridine,
N-ethyl-2-vinylcarbazole,
N-propyl-6-vinylcarbazole,
N-methyl-1-(1-butenyl)carbazole,
N-methyl-7-(1-octenyl)carbazole, and the like.

The preferred heterocyclic monomer is an alkenyl ring-substituted pyridine which can be represented by the following structural formula:

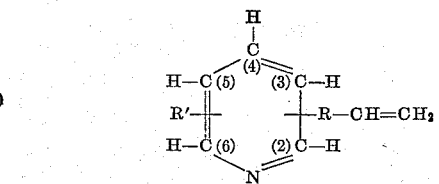

wherein R represents a hydrocarbon group containing from 0 to 6 carbon atoms and more generally from 0 to 2 carbon atoms and R′ is a straight or branched chain alkyl group having from 1 to 6 carbon atoms or is hydrogen.

The reaction diluents used in the present copolymerization process can be the usual solvents employed with a typical Ziegler polymerization system. Examples of materials which are particularly suited for the process of the present invention include $C_6$ to $C_{10}$ saturated aliphatic hydrocarbons such as n-heptane, isooctane, normal decane, etc. Aromatic solvents such as xylene, toluene and benzene can also be used as well as chlorinated aromatic solvents such as chlorobenzene. While all of the aforementioned solvents serve well in the process of the present invention, it should be noted that in reaction systems wherein the polar monomer is complexed with a transition metal salt, such as nickel chloride, halogenated diluents should be used as these complexes have a very small degree of solubility in straight chain or branched chain hydrocarbon diluents. The amount of solvent present in the reaction zone is not a critical feature of the present invention; however, reaction diluents should be present to the extent of about 50 to 500 milliliters of reaction diluent per gram of catalyst used.

A typical Ziegler catalyst system is employed in the present polymerization process between an alpha olefin and a polar heterocyclic compound which has been complexed with a Lewis acid compound. The Ziegler catalyst system is generally made up of a mixture of reducible heavy transition metal compounds such as titanium tetrachloride, titanium trichloride, titanium trichloride cocrystallized with aluminum chloride, vanadium oxychloride, or vanadium tetrachloride and a reducing agent such as an organo-metallic compound, e.g., triethyl aluminum and diethyl aluminum chloride. Other reducing agents such as alkali and alkaline earth metals, and hydrides of aluminum and the like can also be used. The reducing metal compounds most often used are the halides, acetylacetonates, and other compounds of metals of Groups IV through VI and VIII of the Periodic Table. Third component donor compounds such as hexamethylphosphoramide, tri-n-butyl phosphine oxide, water, and hydrogen chloride can be used in combination with the traditional components of the Ziegler catalyst system to increase the rate of polymerization. The catalyst ratio employed in the polymerization of alpha olefins with heterocyclic compounds containing alpha alkenyl substituted side chains is about 1 to 2 mole parts of alkyl metal compound per mole of transition metal halide. When a donor compound is utilized to increase the rate of reaction it is present in amounts of about 0.5 to 1 mole of donor compound per mole of alkyl metal compound.

As stated previously, to effect the polymerization of polar monomers with Ziegler catalyst the donor characteristics of the polar monomer must be neutralized before any polymerization can be effected. By the process of the present invention, the preferred copolymers are formed by complexing the polar monomer with a Lewis acid material such as trialkyl aluminum compounds, dialkyl aluminum chloride compounds, aluminum chloride, zinc chloride, nickel chloride, and the like. The stability of the complex formed between the polar monomer and the Lewis acid material should be at least as high, preferably higher, than the stability of the complexes exchanged between any of the components of the Ziegler catalyst system and the specific polar monomer used. The complex between the polar monomer and the Lewis acid material can be formed in situ in the reaction zone by reacting a slight molar excess of Lewis acid compound with the polar monomer, or the complexing can be performed outside of the reaction zone by contacting the complexing agent and the polar monomer before they are introduced into the reaction zone. Trialkyl aluminum compounds wherein the alkyl group is a $C_1$ to $C_8$ straight chain hydrocarbon are the preferred polar monomer complexing agents. Alkyl aluminum compounds wherein the alkyl group is a branched or cyclic hydrocarbon should not be used as these compounds form complexes with the polar monomer which are readily displaced by the components of the Ziegler catalyst system.

The complexing reaction between the polar monomer and the Lewis acid as well as the polymerization of the complexed polar monomer and the alpha monoolefin is preferably conducted at temperatures in the range of from about 20 to 200° C., and more usually in the range of 50 to 100° C. The pressure at which the polymerization is carried out can vary from atmospheric pressure up to about 2000 p.s.i. depending upon the alpha olefin utilized as the polymerization comonomer. In most cases, however, the pressure at which the polymerization reaction is conducted will vary from about atmospheric pressure to about 500 p.s.i. Polymerization reaction times vary according to the type of monomers used from about 5 minutes to about 10 hours, and more usually from about 30 minutes to about 4 hours. If a donor compound such as hexamethylphosphoramide is used in conjunction with the Ziegler catalyst system sufficient time, usually about 0.5 to 2 hours, should be permitted to allow the third component to complex with the reducing metal component of the Ziegler catalyst system.

The polar monomer concentration in the reaction zone should be maintained at about 0.01 to 2% by weight based upon the reaction diluent to prevent the deactivation of the components of the Ziegler catalyst system by the complexed polar monomer. Preferably, the polar monomer concentration is maintained at about 0.1 to 0.5% by weight based on reaction diluent. During the polymerization reaction, the molar ratio of alpha monoolefin to polar monomer should range from about 1 to 10, and more usually from about 1 to 5. The total catalyst concentration in the reaction zone, excluding the amount of material used to complex the polar monomer, should be about 0.002 to 0.2 mole per liter of diluent and reactant present in the polymerization zone. In most instances, however, catalyst concentration is maintained in the range from about 0.002 to about 0.1 mole of catalyst per liter of liquid present in the reaction zone.

The reaction vessel can be constructed of any suitable material that is inert to the reactants, catalyst, and Lewis acid materials that are used as the complexing agent and is capable of withstanding the operating pressures. Reaction vessels made of glass and glass-lined steel are quite satisfactory.

In a typical procedure, a glass reaction vessel, equipped with a glass agitator, gas inlet and outlet tubes and openings to permit the introduction of liquid reagents, is charged under nitrogen with 4-vinylpyridine and xylene. The polar monomer is previously purified by distillation from calcium hydride or by passage through a column of silica gel. Complexing of the polar monomer is achieved by contacting a slight molar excess of triethyl aluminum with the polar monomer contained in the reaction zone. Agitation is started and an increase of temperature of about 1 to 10° C. is normally observed. The reactor is then heated to a temperature in the range of about 50 to 100° C. while continuously introducing propylene through the gas inlet tube below the liquid surface in the reaction zone. Prior to the introduction of the propylene to the reactor, the alpha olefin is freed from oxygen, water vapor and other contaminants reactable with the components of the Ziegler catalyst system by passage through a gas scrubber containing aluminum triisobutyl. After the reaction diluent has been substantially saturated with propylene, a catalyst mixture consisting of 1 to 2 moles of triethyl aluminum per mole of titanium trichloride in xylene is added to the reactor. The reactor is then heated to the desired polymerization temperature ranging from 20 to 200° C. for a period of about 30 minutes to 4 hours. During the polymerization, propylene monomer inflow is continued during the reaction. In the reaction zone the total catalyst concentration exclusive of the material used to complex the polar monomer should be maintained at about 0.002 to 0.1 mole per liter of reaction solution. The wt. percent of polar monomer based on diluent present in the reaction zone should not exceed 2% by weight and is preferably maintained from about 0.1 to 0.5% by weight. The molar ratio of alpha monoolefin to polar monomer present in the reaction zone should be maintained in the range of from about 1 to 10. Following completion of the reaction, the catalyst is deactivated by introduction of a low molecular weight alkanol such as isopropanol or normal butanol to the reaction mass. Following catalyst deactivation the mixture is then cooled to room temperature and contacted further with a low molecular weight alkanol to precipitate the polymer from the copolymer-reaction diluent mixture. The precipitated polymer is then filtered and washed with a low molecular weight alkanol or a ketone and finally dried to obtain the final copolymer product.

The copolymers of alpha monoolefins and alkenyl ring-substituted nitrogen heterocyclic compounds as formed by the process of the present invention contain about 0.05 to 5% nitrogen by weight, have Kinsinger molecular weights ranging from about 100,000 to 4,000,000 and exhibit intrinsic viscosities ranging from 1.1 to 12 deciliters per gram as measured in Decalin at 130° C. In most instances, however, the present copolymers contain about 0.05 to 3% nitrogen by weight, have Kinsinger molecular weights ranging from 300,000 to 1,500,000 and exhibit intrinsic viscosities of about 2.7 to 7.0 deciliters per gram as measured in Decalin at 130° C. Additionally, qualitative ultraviolet analysis indicated the presence of substituted nitrogen heterocyclic compounds in the copolymer structure.

The copolymers of this invention have many varied uses. The present copolymers exhibit water absorption, vapor permeability, electric characteristics, dye affinity, printability, and adhesion properties which are markedly different from those of corresponding alpha monoolefin copolymers which do not contain the alkenyl substituted polar compound in the polymer structure. For example, the copolymer of propylene and 4-vinylpyridine has a much greater dye affinity for acid and dispersed dyes than the corresponding unmodified polypropylene.

This invention and its advantages will be better understood by reference to the following examples:

EXAMPLE 1

A solution of 5.33 grams of 4-vinylpyridine (50.7 millimoles) freshly distilled from calcium hydride in 800 milliliters of xylene was introduced into a glass reaction vessel which was previously purged 50 minutes with a slow stream of nitrogen. The polar monomer was then complexed by introducing a solution of 5.94 grams (52 millimoles) of triethyl aluminum in 100 milliliters of xylene into the reaction zone. An increase in temperature of 2° C. was observed. The reactor was then heated to 55° C. while saturating the xylene with propylene. The Ziegler polymerization catalyst prepared by aging for 15 minutes 0.57 gram of triethyl aluminum and 0.62 gram of titanium trichloride in 100 milliliters of xylene was then added to the reaction zone. The reaction zone was then heated to 80° C. and propylene feed continued for a total of 1 hour. At the completion of the reaction period, a mixture of 5 milliliters of acetylacetone and 40 milliliters of isopropanol was added to the reactor to kill the catalyst. The reaction mixture containing the copolymer was stirred well for a few minutes, cooled to room temperature and then poured into 2 liters of isopropanol. The precipitated copolymer was stirred, filtered and reslurried for 15 minutes in hot isopropanol containing 5 milliliters of acetylacetone. The mixture was then cooled to room temperature, filtered and the reslurrying repeated. After the final washing process, the polymer was filtered and the filter cake washed with 1 liter of acetone. The resulting polymer was then dried for 16 hours at 50° C. at 160 millimeters of mercury pressure and 52 grams of white copolymer was obtained. The polymer was then reslurried with 1 liter of hot methanol to insure complete removal of vinylpyridine homopolymer, filtered and washed again with 1 liter of acetone and then stabilized. The weight of the solid white polymer was approximately 51.4 grams and was found to have an inherent viscosity of 6.75 deciliters per gram in Decalin at 130° C., a tensile strength at break of 4490 p.s.i., an elongation at break of 15%, a density of 0.9035 gram per cc., and a Kinsinger molecular weight of 944,300. Elemental analysis of the copolymer product indicated the polymer contained about 1.22% nitrogen which corresponds to a copolymer composition of 4.09 mole percent 4-vinylpyridine and 95.91 mole percent propylene.

EXAMPLE 2

In a copolymerization test similar to that outlined in Example 1 above, with the exception that 2.5 grams of 4-vinylpyridine was utilized rather than 5.33 grams and 25 millimoles of complexing agent was utilized rather than 52 millimoles, a yield of 56 grams of polymer was obtained.

The copolymer obtained exhibited an inherent viscosity of 5.82 deciliters per gram in Decalin at 130° C., a Kinsinger molecular weight of 784,600, a density of 0.9065 gram per cc., a tensile strength at break of 4240 p.s.i., and an elongation at break of 15%. Elemental analysis of the copolymer indicated a nitrogen concentration of 0.4 wt. percent which corresponds to a copolymer composition of 1.38 mole percent 4-vinylpyridine and 98.62 mole percent propylene.

EXAMPLE 3

Propylene and 3-(1-propenyl)pyridine that is complexed with a substantially equal molar amount of tirethyl aluminum is polymerized in the presence of vanadium tetrachloride and diethyl aluminum chloride to obtain a polymer product having an average Kinsinger molecular weight in the range of from about 300,000 to 1,500,000. The dyeability of the polymer product with acid and dispersed dyes is superior to the dyeability of unmodified polypropylene.

EXAMPLE 4

Butene-1 and N-ethyl-3-vinylpyrrole that is complexed with a substantially equal molar amount of zinc chloride is polymerized in the presence of vanadium oxychloride and ethyl aluminum dichloride to obtain a polymer product having an average Kinsinger molecular weight in the range of from about 300,000 to 1,500,000. The dyeability of the polymer product with acid and dispersed dyes is superior to the dyeability of unmodified polybutene.

EXAMPLE 5

Propylene and N-ethyl-2-(1-butenyl)acridine that is complexed with a substantially equal molar amount of aluminum chloride is polymerized in the presence of titanium tetrachloride and triethyl aluminum to obtain a polymer product having an average Kinsinger molecular weight in the range of from about 300,000 to 1,500,000. The dyeability of the polymer product with acid and dispersed dyes is superior to the dyeability of unmodified polypropylene.

EXAMPLE 6

Propylene and N-methyl-6-(1-heptenyl)carbazole that is complexed with a substantially equal molar amount of tripropyl aluminum is polymerized in the presence of titanium trichloride, triethyl aluminum, and hexamethylphosphoramide to obtain a polymer product having an average Kinsinger molecular weight in the range of from about 300,000 to 1,500,000. The dyeability of the polymer product with acid and dispersed dyes is superior to the dyeability of unmodified polypropylene.

The advantages of this invention will be apparent to those skilled in the art. Polymers of polar monomers can be directly prepared by the process of the present invention. It is to be understood that this invention is not limited to the specific examples set forth herein, which have been offered merely as illustrations, and that modifications may be made without departing from the spirit and scope of the appended claims.

What is claimed is:

1. A process for making copolymers of an aromatic heterocyclic compound having as the hetero atom a nitrogen atom and an aliphatic alpha monoolefin which comprises complexing said heterocyclic compound containing a $C_2$ to $C_8$ alpha alkenyl substituent with a Lewis acid selected from the group consisting of trialkyl aluminum and dialkyl aluminum chloride wherein the alkyl is a $C_1$ to $C_8$ straight chain alkyl; and copolymerizing said complexed heterocyclic compound with a $C_2$ to $C_6$ aliphatic alpha monoolefin in the presence of a Ziegler catalyst.

2. The process of claim 1, wherein said heterocyclic compound is a $C_2$ to $C_8$ alpha alkenyl ring-substituted quinoline.

3. The process of claim 1, wherein said heterocyclic compound is a $C_2$ to $C_8$ alpha alkenyl ring-substituted N—$C_1$ to $C_5$ alkyl-pyrrol.

4. The process of claim 1, wherein said heterocyclic compound is a $C_2$ to $C_8$ alpha alkenyl ring-substituted N—$C_1$ to $C_5$ alkyl-acridine.

5. The process of claim 1, wherein said heterocyclic compound is a $C_2$ to $C_8$ alpha alkenyl ring-substituted N—$C_1$ to $C_5$ alkyl-carbazole.

6. The process of claim 1, wherein said heterocyclic compound is a $C_2$ to $C_8$ alpha alkenyl ring-substituted pyridine.

7. The process of claim 1, wherein the Ziegler catalyst comprises triethyl aluminum and titanium trichloride.

8. The process of claim 1, wherein the Lewis acid is an aluminum compound having 1 to 4 carbon atoms per alkyl group.

9. The process of claim 1, wherein the copolymerization is carried out at a temperature ranging from about 0° to 100° C. in the presence of an inert diluent.

10. A process for making copolymers of polar monomers and aliphatic alpha monoolefins which comprises complexing a vinylpyridine compound with a substantially equal molar amount of triethyl aluminum and copolymerizing said complexed vinylpyridine compound with propylene in the presence of a Ziegler catalyst comprising triethyl aluminum and titanium trichloride, the molar ratio of triethyl aluminum to titanium trichloride being from about 3:1 to 1:1.

11. The process of claim 10, wherein the polymerization is carried out at a temperature ranging from about 50 to 100° C. in the presence of an inert diluent.

12. The process of claim 10, wherein the vinylpyridine compound is 4-vinylpyridine.

References Cited
UNITED STATES PATENTS

| | | | |
|---|---|---|---|
| 2,732,350 | 1/1956 | Clarke | 260—88.1 |
| 2,910,461 | 10/1959 | Nowlin et al. | 260—88.1 |
| 3,196,136 | 7/1965 | Boutsicaris | 260—88.1 |
| 3,256,364 | 6/1966 | Bryant et al. | 260—88.1 |

JOSEPH L. SCHOFER, *Primary Examiner.*

M. B. KURTZMAN, *Assistant Examiner.*